US006685562B1

(12) United States Patent
Rantanen

(10) Patent No.: US 6,685,562 B1
(45) Date of Patent: Feb. 3, 2004

(54) METHOD AND SYSTEM FOR ARRANGING ELECTRONIC QUICK LOTTERIES

(75) Inventor: Anssi Rantanen, Helsinki (FI)

(73) Assignee: Oy Veikkaus Ab, Veikkaus (FI)

( * ) Notice: Subject to any disclaimer, the term of this patent is extended or adjusted under 35 U.S.C. 154(b) by 0 days.

(21) Appl. No.: 09/856,027

(22) PCT Filed: Nov. 24, 1999

(86) PCT No.: PCT/FI99/00970

§ 371 (c)(1),
(2), (4) Date: Jul. 11, 2001

(87) PCT Pub. No.: WO00/30725

PCT Pub. Date: Jun. 2, 2000

(30) Foreign Application Priority Data

Nov. 25, 1998 (FI) .................................................. 982554

(51) Int. Cl.$^7$ .................................................. A63F 13/12

(52) U.S. Cl. ............................. 463/17; 463/25; 463/29; 700/91

(58) Field of Search ............................. 463/17, 25, 29; 700/91

(56) References Cited

U.S. PATENT DOCUMENTS

| | | | | |
|---|---|---|---|---|
| 4,832,341 A | | 5/1989 | Muller et al. | 463/17 |
| 5,119,295 A | | 6/1992 | Kapur | 463/41 |
| 5,324,035 A | | 6/1994 | Morris et al. | 463/42 |
| 5,327,485 A | | 7/1994 | Leaden | 463/17 |
| 5,417,424 A | | 5/1995 | Snowden et al. | 463/18 |
| 5,497,990 A | | 3/1996 | Nanni | 463/18 |
| 5,871,398 A | * | 2/1999 | Schneier et al. | |

FOREIGN PATENT DOCUMENTS

| | | |
|---|---|---|
| GB | 2128486 | 5/1984 |
| WO | 9702074 | 1/1997 |
| WO | 9852661 | 11/1998 |

* cited by examiner

*Primary Examiner*—Andrew M. Dolinar
(74) *Attorney, Agent, or Firm*—Ware, Fressola, Van Der Sluys & Adolphson LLP

(57) ABSTRACT

To arrange an electronic instant lottery, a plurality of electronic instant lots (510) is generated (401, 605) and stored (402, 406, 606), each of which comprises prize data which is encrypted and can be decrypted with a lot-specific key. The keys (511) with which the encrypted prize data of the stored electronic instant lots can be decrypted are stored (403, 405) separately from the stored electronic instant lots. A given player (404) is provided with access to the stored electronic instant lots such that, by paying a given fee, the player acquires a given electronic instant lot. The player is also provided with access to the stored keys such that, by presenting a proof of his possession of a given electronic instant lot, the player acquires the key corresponding to this particular electronic instant lot.

27 Claims, 9 Drawing Sheets

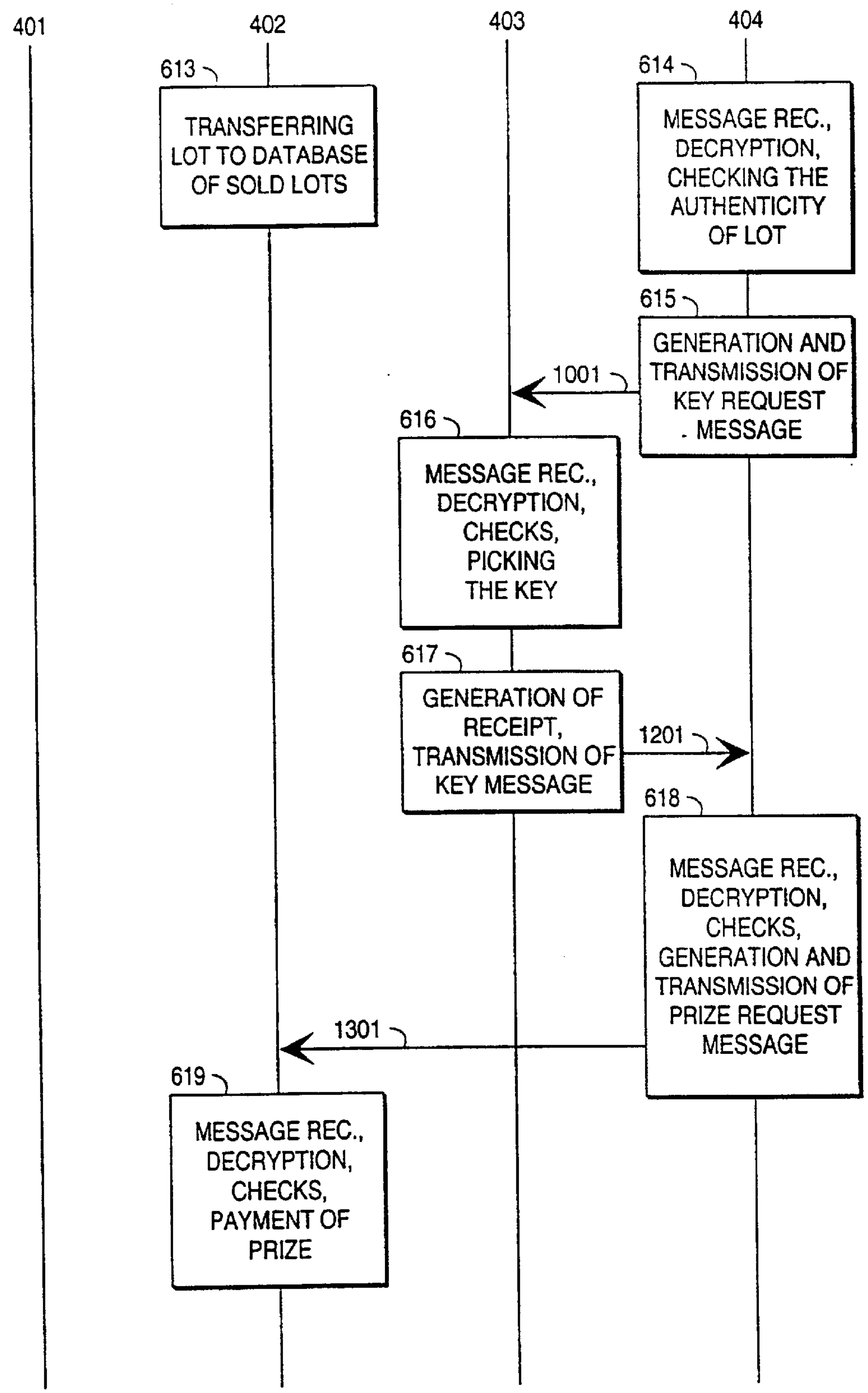
...Fig. 6

METHOD AND SYSTEM FOR ARRANGING ELECTRONIC QUICK LOTTERIES

TECHNICAL FIELD

The invention relates generally to transmission of confidential data in a data network. The invention relates especially to a method and a system for transmitting data allowing direct distribution of a randomly determined benefit in a data network in response to a given payment.

BACKGROUND OF THE INVENTION

Conventional instant lotteries are usually based on lottery tickets made of paper or paperboard containing printed information about the prize—if any—offered by the lottery ticket. The information is protected e.g. with a tear-off tab or a scratch off surface, which is intact when the ticket is purchased and may be broken by the purchaser only when he has paid for the ticket.

As data transmission and even money transactions are increasingly performed by electronic means, in open data networks as the Internet, it would be preferable to be able to carry out services like instant lotteries by electronic means in a data network. In this context, an open data network implies any network or network combination for electronic data transmission, which does not assure data security as such, but in which, by using special encrypting provisions, it is possible to safely transmit even confidential information. As stated herein, electronic instant lotteries stand for a game in which the customer, i.e. the player, buys a benefit immediately available against a certain payment, the value of the benefit being determined by random. Instant lotteries with electronic user interfaces may resemble lottery tickets shown on a display or they may be performed in some completely different way. As an example of various electronic instant lotteries, it would be conceivable to provide an interactive game played over a data network, in which a player can open a hatch or a door by paying, whereby an object, passage or any other benefit exposed behind the door is determined substantially by random.

Security involves a special problem when electronic instant lotteries are arranged. Both the player and the lottery agency should be able to authenticate the other party as the one he/she claims to be. The content of data passing over a data network should not be corrupted during the transmission, nor should the data sender be able to subsequently repudiate his transmission of these particular data. In addition, third parties should not be able to break the privacy of confidential data. All confidential data transmissions over data networks have these features in common. In addition to this, in the case of electronic instant lotteries, security involves all the preventive actions against abuse of the system for instance by fraudulent discovery of the winning tickets and the prizes they offer, or in a given player or players getting hold of electronic instant lottery tickets without paying the due fee.

FIG. 1 shows a conventional system for arranging instant lotteries or a similar money game at least partly over a data network. The player's computer 102 and the lottery agency's server are connected to data network 101. In the server, a game program 104 is running, in which the player can buy lots in a generic sense of this concept. Over the game period, a "protected" session is formed between the computer 102 and the server 103, illustrated schematically in the figure by pipe 105. This session has the function of accomplishing all those features mentioned above, common for all confidential data transmissions.

The system shown in FIG. 1 involves the problem of the player or the game supervising authority not knowing whether the game program 104 runs correctly or not. In practice, the lottery agency can program his server for instance so that a player cannot win but very small prizes. Since the probability of winning big prizes is small in any case, the player cannot know whether big prizes are not won due to bad luck or to the lottery agency's dishonesty. At the most, the supervising authority may check the prize distribution in the long term and thus strive to conclude whether the game program functions the way the lottery agency has reported. If the lottery agency is a company with several employees, the company may perhaps have honest intentions as such, however, one or more among the staff may abuse their information about the game program structure and direct prizes to themselves in a non-random way. For the lottery agency, especially in lotteries with big individual prizes, the system of FIG. 1 involves the additional problem of not allowing an upper limit to be quite reliably set for the total sum of the prizes to be paid.

SUMMARY OF THE INVENTION

The object of the present invention is to suggest a method and a system which function more safely than the conventional system described above. Another object of the invention is to provide electronic instant lotteries which are applicable to various interfaces and game systems.

The objects of the invention are achieved by using encrypted lots and a key database which is separate from the lot database.

According to if the invention the method comprises the steps of

- generating and storing a plurality of instant lots, each of which comprises prize data which is encrypted and can be decrypted with a lot-related key,
- storing the keys with which the encrypted prize data of stored electronic instant lots can be decrypted, separately from the stored electronic instant lots,
- providing a given player access to the stored electronic instant lots so that the player acquires a given electronic instant lot and
- providing said player access to the stored keys so that the player acquires a key to corresponding to a given electronic instant lot.

The invention is also directed to a system comprising

- a first data system for generating at least partly encrypted electronic instant lots,
- a second data system for storing the generated, at least partly encrypted electronic instant lots,
- a third data system for storing such lot-related keys with which the electronic instant lots can be decrypted, separately from the electronic instant lots,
- a data transmission connection from the first data system to the second data system and a third data system, and
- means for offering a number of players a data transmission connection to the second data system to give the player access to electronic instant lots and to the third data system for giving the player access to keys corresponding to the electronic instant lots.

Encryption and decryption of messages is known per se. In accordance with the invention, each message representing an individual electronic lot is encrypted separately and the encrypted lots are stored in a specific lot database. In addition, a key database is formed, which contains a key corresponding to each individual encrypted lot, the key serving to decrypt the lot. When a player acquires a specific lot, he gets a message representing the encrypted lot and a game receipt as evidence of his legal acquisition of the lot. By presenting his receipt to the key database, the player gets a key, with which he can decrypt the lot. Should the lot prove to offer a prize, the player can present the lot and the game receipts as evidence of legal reception of the lot and the key to the lottery agency, who delivers the prize to the player. The order of giving the player access to the lot and to the corresponding key can also be inverse.

A prerequisite for ensuring safety is that the lots are generated and encrypted by a particular lot press, i.e. a reliable party which does not benefit from the winning lots being sold or unsold. The lot database generated by the lot press and containing encrypted lots can be put under the control of the lottery agency. The key database consisting of keys required for decrypting the lots can be kept under the control of the lot press or delivered to a particular key holder, who is also a reliable party not participating in the game. The key database may, of course, also be under the control of the lottery agency, however, such an arrangement may result in the players having less confidence in the honesty of the game. The data transmission connections between a player, a lottery agency, a lot press and a key holder over a data network can be protected by using methods known per se for transmitting confidential data over a data network.

BRIEF DESCRIPTION OF THE DRAWINGS

The invention is explained in greater detail below with reference to exemplifying preferred embodiments and the accompanying drawings, in which.

BEST MODE FOR CARRING OUT THE INVENTION

Figure 1:
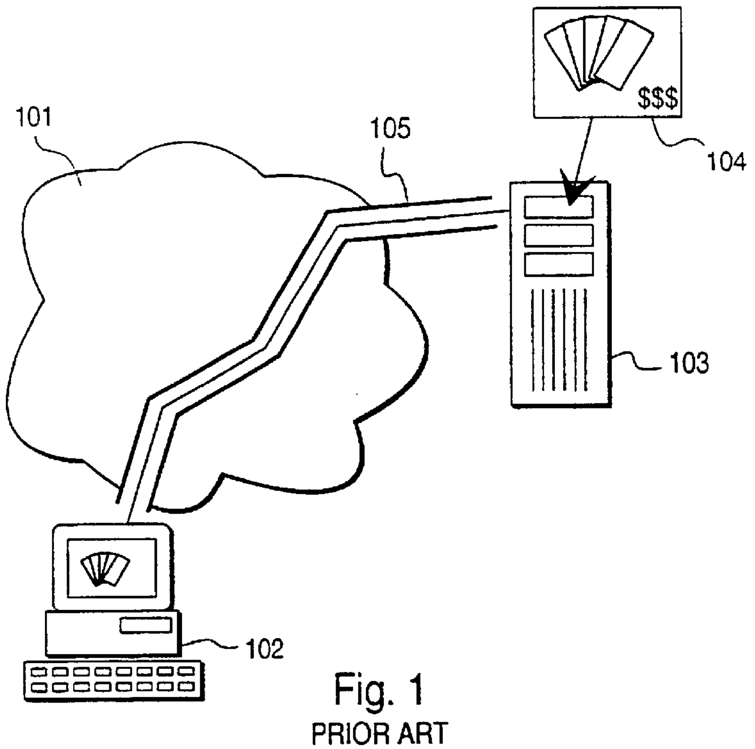
Fig. 1 PRIOR ART
FIG. 1 shows a conventional electronic game system.

The prior art disclosure above refers to FIG. 1, and thus the following description of the invention and its preferred embodiments will refer mainly to FIGS. 2–17. The same reference numerals are used for corresponding parts in the figures.

In conjunction with the present invention, it is preferable to use a number of methods known per se, which relate to the encryption and decryption of electronic messages. To state the background of the invention, these methods will first be explained.

The encrypting methods applied in connection with electronic data processing can be divided into symmetric and asymmetric methods. The invention as such does not restrict the application of symmetric or asymmetric methods to the invention, even if the latter involve certain advantages owing to the nature of electronic lotteries. Combinations of symmetric and asymmetric methods are also usable in connection with the invention.

In symmetric methods, the same key is used for encrypting and decrypting a message. In this case, both the person who encrypts the message and the person who decrypts the message must know the key. The best known symmetric method is the one called the DES method (Data Encryption Standard). In asymmetric methods, the keys form equivalent pairs, so that a message encrypted with a particular first key can be decrypted with a second key corresponding to the first key. The person who performs the encryption does not need to know the decryption key, nor does the person who performs the decryption need to know the encryption key. The best known asymmetric method currently used is the one called the RSA method (Rivest-Shamir-Adleman), in which the first key is called the public key and the second key is called the private key.

Figure 2:
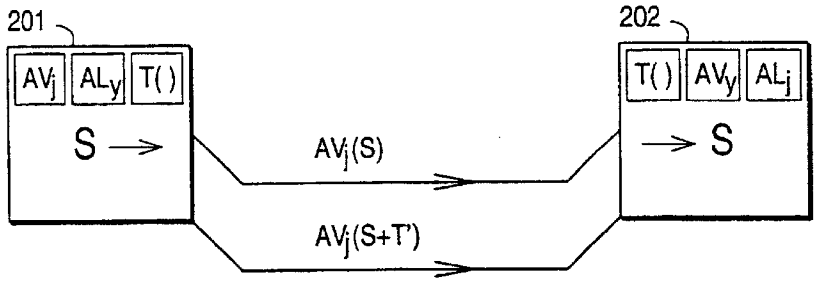
Fig. 2 PRIOR ART
FIG. 2 shows an electronic encrypting system known per se.

FIG. 2 shows a system which comprises a sender (L) 201 and a recipient (V) 202. The sender knows the recipient's public key $AV_j$ and the recipient knows his own private key $AV_y$. When the sender 201 wishes to send the recipient 202 a message S, he encrypts it with the recipient's public key before transmitting it, and then the encrypted message passing over the data transmission connection can be marked as $AV_j(S)$. Having received the encrypted message, the recipient 202 decrypts it using his private key, resulting in the original unencrypted message; the operation can be represented by the mathematical formula $$AV_y[AV_j(S)]=S. \tag{1}$$

The key properties have been selected such that the encrypted message is almost impossible to open with anything else but the intended recipient's private key.

However, the procedure described above does not convince the recipient 202 of the fact that the message has been sent precisely by the sender 201, since, by definition, the recipient's public key used in the message encryption is typically publicly known. The authenticity of the sender can be verified with a "digital signature", following the principle that the sender 201 uses his own private key $AL_y$ to encrypt a part of the message and accordingly, the recipient uses the sender's public key $AL_j$ to decrypt this particular part of the message. As a result of the key properties, a message which can be decrypted with a particular sender's public key cannot have been encrypted with any other key than the particular sender's private key.

Basically, the signature procedure can be applied even to the entire message, and then the message $AL_y[AV_j(S)]$ is transmitted over the data transmission connection.

The decrypting operation performed by the recipient can then be represented by the formula $$AV_y[AL_j[AL_y[AV_j(S)]]]=AV_y[AV_j(S)]=S. \tag{2}$$

In the practice, one usually uses a hash formed from message S with a specific (almost) unambiguous algorithm, which can be marked T(S) in this context. The hash acts as a checksum, so that, should the content of the actual message be corrupt, the same hash can no longer be inferred from it by calculating; by comparing the initial hash with the subsequently calculated hash one can check whether the message has been modified after it was generated. A hash which has been encrypted using the sender's private key is marked with T', i.e.

$$T'=AL_y[T(S)]. \quad (3)$$

The encrypted hash T' is called the sender's digital signature. A new message S' is formed by adding the encrypted hash to the initial message S, i.e.

$$S'=S+T' \quad (4)$$

If necessary, this new message can be further encrypted with the recipient's public key, and then the message $AV_j$ (S+T') is transmitted over the data transmission connection. The recipient 202 first decrypts the message using his private key, thus obtaining the combination S+T'. If the encrypted hash T' separated from this is decrypted with the sender's public key according to formula $$AL_j[T']=AL_j[AL_y[T(S)]]=T(S) \quad (5)$$

then the recipient knows that the hash cannot have been encrypted with anything but the sender's private key. In addition, the hash allows the recipient to ascertain that the content of the message has retained its integrity since the sender formed it.

Figure 3:
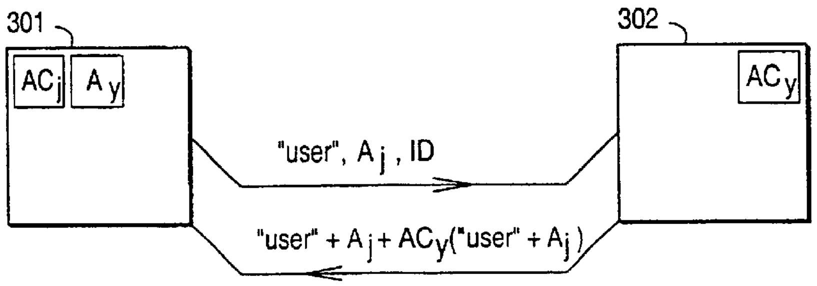
Fig. 3 PRIOR ART
FIG. 3 shows a known electronic certification system.

It has been assumed above that public keys can be reliably associated with a specific holder. To ensure this, an independent third party usually called Certificate Authority can be used. In the most elementary procedure, the Certificate Authority publishes an index of the public keys of all the parties. In that case, however, to check the holder of a particular public key, this index needs to be contacted in each case. In a more advanced procedure, the Certificate Authority generates a certificate for each party as illustrated in FIG. 3. The data communication party 301 present's his public user identifier, his public key $A_j$ and his identity proof to the Certificate Authority 302. Having ascertained the identity of the data communication party 301 with the elements above, the Certificate Authority provides the party with a certificate according to the following formula using the symbols above $$\text{"user"}+A_j+AC_y(\text{"user"}+A_j), \quad (6)$$

in which $AC_y$ is the Certificate Authority's private key. If the corresponding public key $AC_j$ is publicly known, anybody can use the certificate to ascertain that $A_j$ is the public key used by the data communication party 301 known by the username "user".

Figure 4:
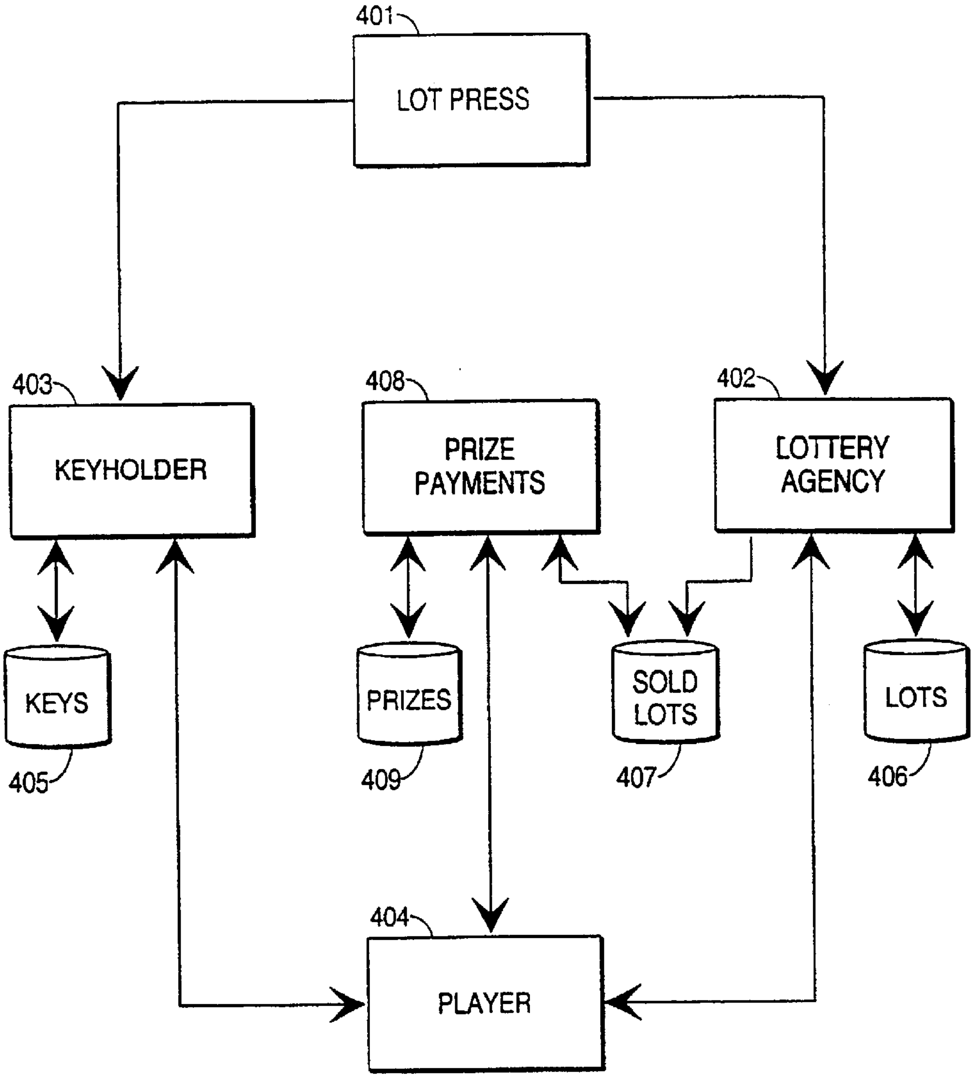
FIG. 4 shows the principle of the present invention.

FIG. 4 is a schematic view of a preferred embodiment of the invention, comprising four parties participating in the operation: the lot press 401, the lottery agency 402, the key holder 403 and the player 404. The data transmission connections between the participating parties preferably pass over a data network, although they are indicated with single lines in the figure. The function of the lot press 401 is to produce electronic lots in the form of records. Each lot record contains an unambiguous identifier and encrypted prize data. A separate lot-related key has been used to encrypt each lot record. The lot press forms a key database 405 from decryption keys corresponding to these keys, and the key database is delivered to the key holder 403. The lot records are stored in the lot database 406, which is delivered to the lottery agency 402. The lottery agency also maintains a sold lots database 407 and a prize payment service 408, for which a special prize database 409 is provided.

When the player 404 wishes to buy a lot, he contacts the lottery agency 402 and pays for the lot, i.e. pays a given fee; the way the payment is made will be described in detail below. Having paid the fee, the player gets access to a lot in the lot database and a receipt of the legally made payment. The choice of the lot can be given to the player himself or the lottery agency's computer can make it on behalf of the player. To eliminate certain safety risks, it is preferable that the player is not personally given the choice of the lot, but the lottery agency's computer makes a random choice of the lot. The selected lot is removed from the lot database 406 or is marked as sold, in order to avoid that the same lot is sold twice. At the same time the lot is entered in the sold lots database 407. Since the lot prize data have been encrypted, the player does not know at this stage whether he has purchased a winning lot or not.

After this, the player contacts the key holder 403 and presents the proof of his legal purchase of a given lot he has been given by the lottery agency. The proof includes an unambiguous lot identifier, by means of which the key holder 403 searches, in the key database 405, the key which decrypts the encryption of this particular lot. The key holder delivers the key and the proof of its reception to the player, who now has access both to the lot and to the key with which he can decrypt the lot in order to find out whether it is a winning lot or not. The player also has proofs of having received access to the lot and the key according to the rules.

The player decrypts the lot with the key and checks the prize data. If the lot was not a winning lot, the game ends here. If, however, the lot is entitled to a prize, the player contacts the prize payment service 408 and presents both the lot and the proofs he has received. The prize payment service first checks that this particular lot has been sold in its sold lots database 407. After this, the prize payment service verifies the proofs to confirm that the player has purchased the lot and got possession of the corresponding decryption key by legal means. The prize payment service further checks that the lot really is a winning lot and that the corresponding prize has not been previously collected. If all the verifications are successfully accomplished and no errors are observed, the prize is paid to the player.

Figure 5A:
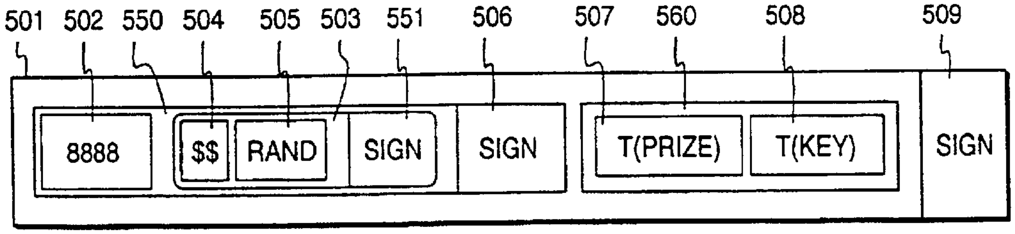
FIG. 5*a* shows a preferred electronic lot structure.

FIG. 5a shows a preferred record structure usable to illustrate an electronic lot. The record 501 comprises a "primary" lot record 550 and a supplementary data field 560. The primary lot record comprises a plain-text identifier field 502, which contains an unambiguous lot identifier. In addition, the primary lot record comprises a prize data field 503, which includes data on the prize amount or any nature of the prize 504 and also a random number 505, which has the task of "masking" the prize data for a purpose described below. The content of the prize data field 503 is protected with the innermost digital signature 551 of the lot press and encrypted with a given lot-related key; the encryption is represented by the rounded corners of the prize data field 503 in the figure. In a preferred embodiment of the invention, the prize data field is encrypted using a key of the symmetric encryption system, i.e. a DES key, however, a first lot-related key in an asymmetric encryption system can also be used to encrypt the prize data field. The primary lot record formed by the identifier field 502 and the prize data field 503 is protected with the central digital signature 506 of the lot press.

The supplementary data field 560 of the record 501 comprises a hash 507 generated with a unidirectional function from the unencrypted prize data field (prize data+a random number), and a hash 508 generated with a unidirectional function from the lot-related key decrypting the prize data. In addition, the hash generated from the key can also be incorporated in the primary lot record, which is not, however, illustrated in FIG. 5. The lot-related random number included in the prize data field besides the prize data ensures that the winning lots cannot be identified by generating hashs of all the potential prize data. If the symmetric method has been applied to the prize data encryption, one and the same key will be treated as the key in the future. If, again, the prize data have been encrypted by the asymmetric method, the key needed for decryption is the corresponding second key of the asymmetric method. Unidirectional function implies that the original data on which the hash has been calculated or the mode of the hash calculation function cannot been inferred from the hash provided by it. Additionally, the entire record 501 has been signed with the outmost digital signature 509 of the lot press.

Figure 5B:
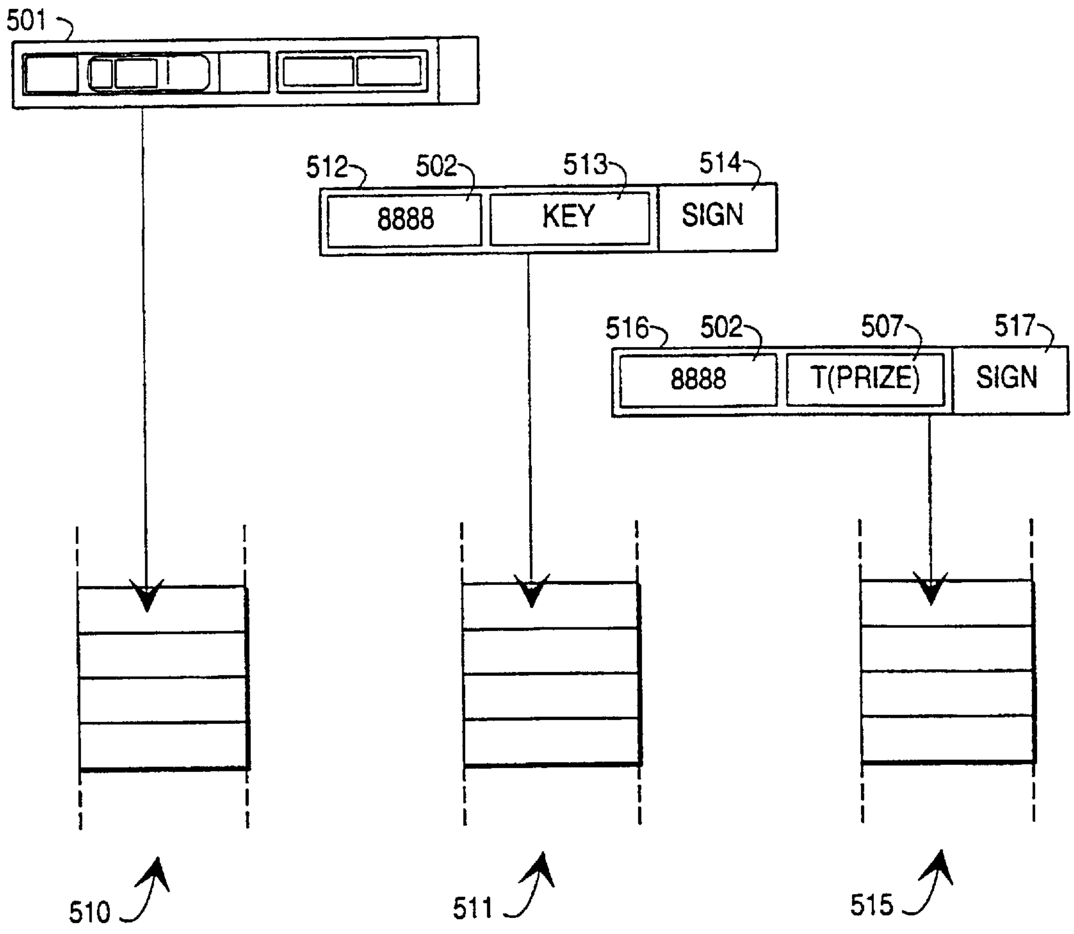
FIG. 5*b* shows a preferred database organisation.
Figure 7:
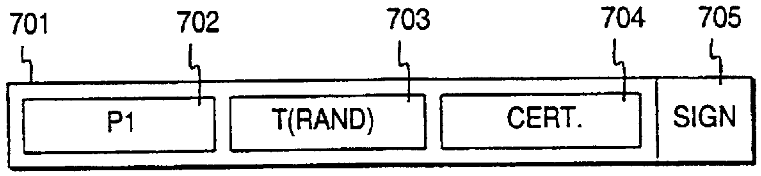
FIG. 7 shows a preferred lot request structure.
Figure 8:
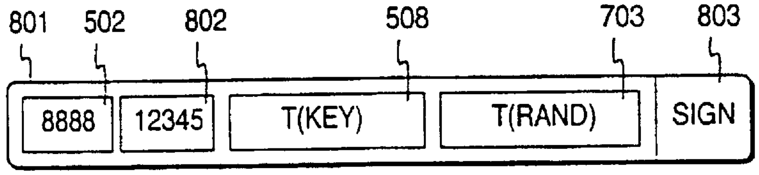
FIG. 8 shows a preferred sales receipt structure.

FIG. 5*b* shows the databases generated by the lot press in a preferred embodiment of the invention. The lot database 510 is simply a database which comprises a set of lot records 501. The key database 511 comprises one key record 512 for each lot record included in the lot database 510. The key record 512 comprises a plain-text lot identifier 502 and the key 513 needed for decryption of the lot. The key record is signed with the digital signature 514 of the lot press. The prize database 515 is a database which comprises a prize record 516 for each lot. The record comprises a plain-text lot identifier 502 and a hash 507 calculated on the prize data field of the lot, and it has been protected with the digital signature 517 of the lot press.

Figure 6:
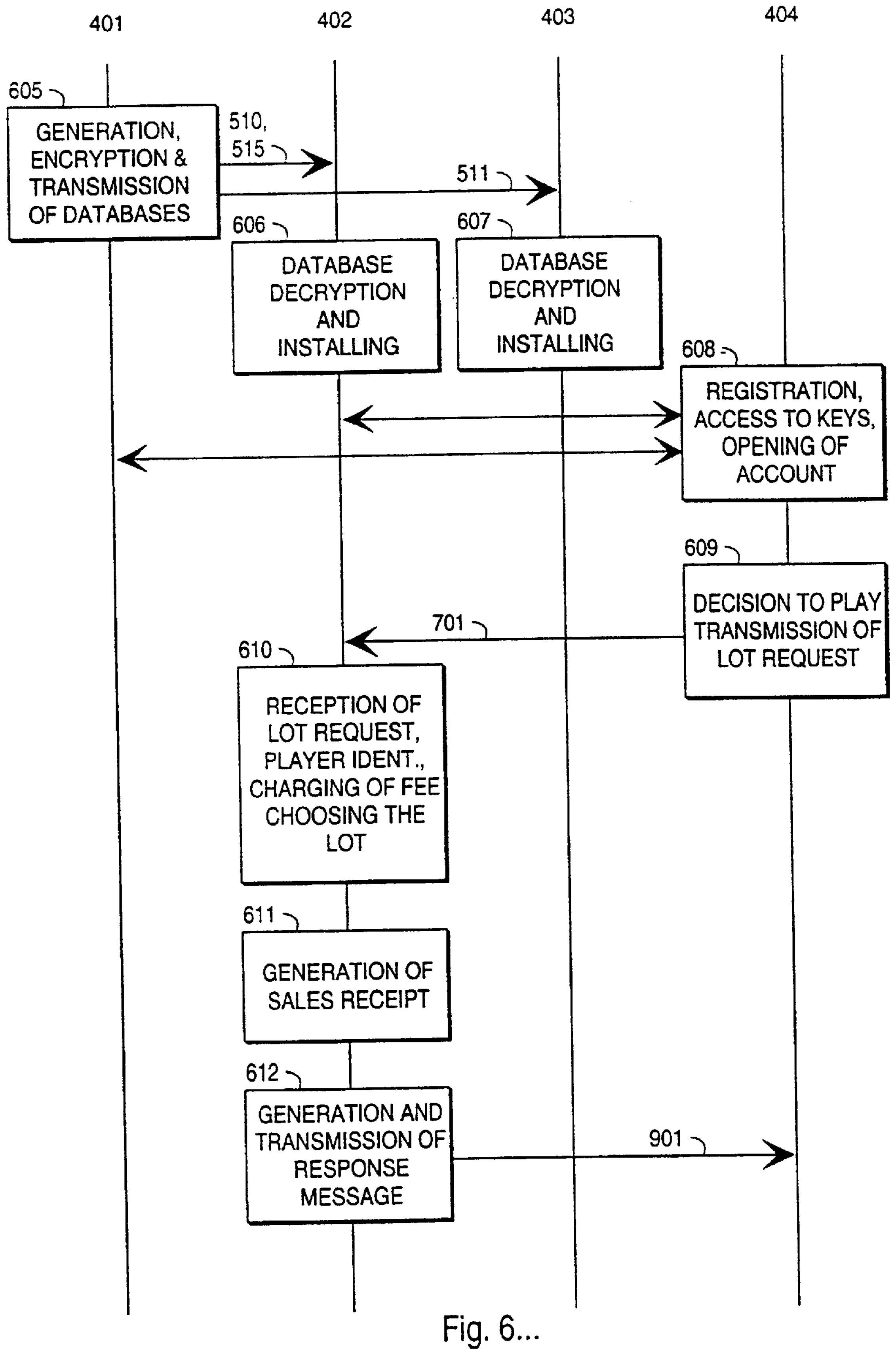
FIG. 6 shows a method according to the invention.

FIG. 6 illustrates in detail a preferred method for implementing the invention. Among the parties participating in the operation, the lot press 401, the lottery agency 402, the key holder 403 and a player 404 have been separately illustrated. It is obvious to those skilled in the art that the electronic instant lotteries of the invention are intended to be played by a very large number of players, however, for clarity's sake, the operation of one single player will be described below. The description can be easily generalised so as to cover a large number of players. Several passages of the following description refer to public and private keys, assuming that a given asymmetric encryption system is available for encrypting and decrypting given messages.

In step 605, the lot press generates the lot database, key database and prize database of FIG. 5*b*. It encrypts the lot database and the prize database with the lottery agency's public transport key and sends the encrypted databases to the lottery agency. Similarly, the lot press encrypts the key database with the key holder's public transport key and sends it to the key holder. In step 606, the lottery agency decrypts the transport encryption in the lot database and the prize database and installs the databases in a given game server or several game servers. Similarly, in step 607, the key holder decrypts the transport encryption in the key database and installs it in a given key server or a number of key servers. Access limitations, firewalls, supervision and other procedures known per se in good data security practice are implemented to protect the databases stored in the game and key servers against unauthorised access attempts.

In step 608, the player registers as a player in the game system maintained by the lottery agency. For supervising purposes, the player can be required to register also in the lot press system. The registration may be arranged for instance such that the player receives a computer program needed for the game from the lottery agency or the lot press. In conjunction with the registration, it is also advantageous to open a game account for the player in the data system maintained by the lottery agency, the game fees and prize collections being handled over this account. Electronic money transactions in a data network or associated with it are known per se, and the invention does not set limits to how they are performed. The invention merely requires an operative arrangement between the player and the lottery agency, allowing the player to pay the given game fee and to collect any prizes won. Also in step 608, the computer program needed for the game generates the number of public and private keys the player needs. To ensure the authenticity of the public keys, the certificating procedure described above can be used, in which for instance the lot press acts as the Certificate Authority.

In step 609, the player decides to purchase an electronic instant lot from the lottery agency. The computer program used by the player generates a certain random number and calculates a hash on this with a unidirectional function. The player sends a lot request to the lottery agency's game server over the data network. The request is most preferably in the form of the message 701 of FIG. 7, which comprises one public key 702 for the player, a hash 703 of the random figure above and the player's certificate 704. The message is protected with the player's digital signature 705. It can be additionally encrypted with the lottery agency's public key. In step 610, the lottery agency receives the message, decrypts any encryption by using his private key, and identifies the player on the basis of the user identifier included in the certificate. The lottery agency charges the price of the lot from the player's game account and picks a random lot from the lot database. The choice of the lot can also be performed such that the player at least gets the impression of being allowed to personally choose the lot he desires. For instance a graphically presented lot fan can be displayed on the player's computer screen, from which he may draw the lot he desires by clicking it with the mouse. For the consistency of the reference numerals, the selected lot is assumed below to be the same that has been explained above in connection with FIGS. 5*a* and 5*b*.

In step 611, the lottery agency generates a sales receipt intended to provide evidence of the legal acquisition of a given lot by a given player. The sales receipt is most preferably the record 801 of FIG. 8, which comprises the identifier 502 of the selected lot, an unambiguous transaction identifier 802, a key hash 508 readable in the chosen lot, and the hash 703 of the random number sent by the player. The lottery agency protects the sales receipt fields mentioned above with its digital signature 803. The sales receipt is intended to be read by the key holder, and thus the lottery agency encrypts it using the key holder's public key.

Figure 9:
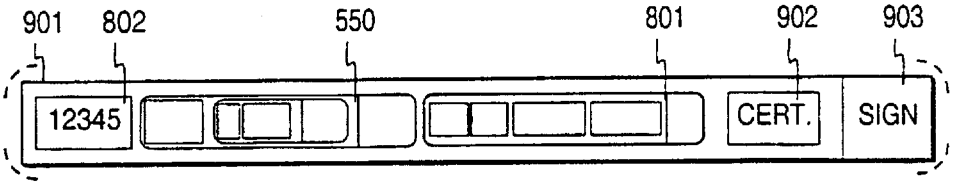
FIG. 9 shows a preferred response message structure.

In step 612, the lottery agency encrypts the primary lot record included in the selected lot and the sales receipt generated above using the player's public key and sends it to the player. In the transmission, the message form 901 of FIG. 9 can be used. It contains the transaction identifier 802, the encrypted primary lot record 550, the encrypted sales receipt record 801 and the lottery agency's certificate 902. The message is protected with the lottery agency's digital signature 903. However, it is usually preferable to use a message form in which the mutual order of encryptions and signatures has been selected such that the outermost operation is always an encryption: the message form illustrated in FIG. 9, for instance, can be further encrypted with the player's public key. In FIG. 9, the encryptions are shown with rounded corners drawn with broken lines.

In step 613, which may take place before or after step 612, the lottery agency removes the sold lot from the lot database and generates a sold lots database record, which most preferably comprises at least the transaction identifier, the encrypted primary lot record, the encrypted sales receipt record and the prize data hash. The storage of the sales transaction in the sold lots database guarantees that, should a data communication error or any other temporary disorder prevent the player from receiving the response message 901 corresponding to the lot he has purchased, he may ask the lottery agency to retransmit it to him.

In step 614, the player receives a message 901. If the message in its totality is encrypted with the player's public key, he decrypts it with his private key. Using his private key, the player decrypts the primary lot record with and the outermost encryption of the sales receipt record. At the same time, he ascertains using the digital signature of the lot press included in the primary lot record that the received message really contained a lot generated by the lot press which had not been corrupted.

Figure 10:
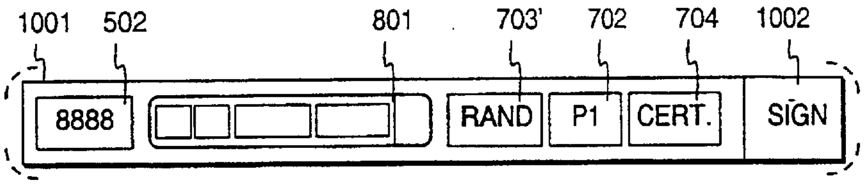
FIG. 10 shows a preferred key request message structure.
Figure 11:
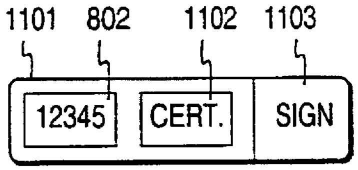
FIG. 11 shows a preferred key receipt structure.
Figure 12:
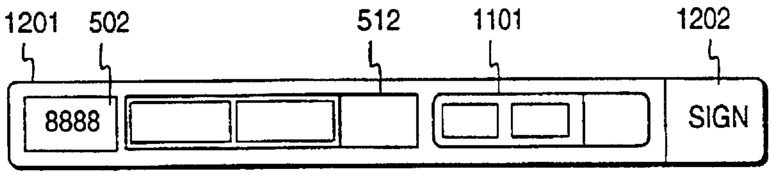
FIG. 12 shows a preferred key message structure.
Figure 13:
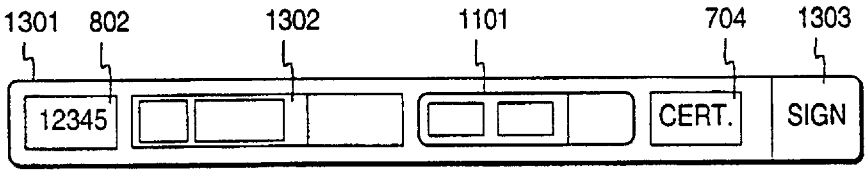
FIG. 13 shows a preferred prize claim message structure.

Next, the player acquires a key from the key holder to allow him to decrypt the lot he has purchased. If the player does not yet have access to the key holder's public key, he acquires it by some method known per se. In step 615, the player sends a key request message to the key holder, the message being most preferably a message 1001 as shown in FIG. 10. It contains the identifier 502 of the purchased lot, the sales receipt 801 (which is still encrypted with the key holder's public key), the random figure previously generated by the player (i.e. not its hash) 703', the player's public key 702 and the player's certificate 704. If the key hash is not included in the primary lot record, the key request message may contain also the key hash in the form the player has read it in the primary lot record he has received. The message 1001 is protected with the player's digital signature 1002 and it can be encrypted with the key holder's public key for transmission. The encryption is illustrated in FIG. 10 with rounded comers drawn with broken lines. As stated above, it is usually preferable to choose an encryption rather than a digital signature as the outermost operation.

In step 616, the key holder receives a message 1001, decrypts any encryption using his private key and decrypts the sales receipt encryption included in the message. The sales receipt gives the key holder confirmation that the key request sent by the player is based on a lot legally obtained from the lottery agency and duly paid. By comparing the random number sent by the player with its hash included in the sales receipt, the key holder ascertains that the player who makes the key request is identical to the one who has purchased this particular lot, because only this particular player may have this particular random number. If the check does not reveal anything suspicious, the key holder retrieves this key record from the key database and additionally checks by means of the key hash included in the sales receipt, or else in the message 1001, that the player has actually bought a lot corresponding to this particular key. The key holder also logs all the data relating to the key request and the delivery in a special log database.

In step 617, the key holder generates a receipt of the delivery of the key. The receipt is most preferably like the one shown in FIG. 11, and it comprises the transaction identifier 802 and the key holder's certificate 1102 in a given message 1101. The receipt is additionally protected with the key holder's digital signature 1103, and since it is meant to be read by the lottery agency, it is encrypted by using the lottery agency's public key. Further, in step 617, the key holder sends the player the key he has requested in a message, which is most preferably like the one shown in FIG. 12. The message 1201 comprises a key record 512, the key delivery receipt 1101 generated above and the key holder's digital signature 1202. For transmission, the key message 1201 is encrypted with the player's public key.

In step 618, the player has received the key message 1201 from the key holder and may start checking whether the lot he has purchased is a winning lot. The player decrypts the key message with his private key and checks by means of the digital signature included in the key record that the key record originates from the lot press, that it has not been corrupted during the transmission, and that it relates to the lot held by the player. The player decrypts the prize data in the lot using the key included in the key record and learns whether the lot offers a prize or not. If the lot was not a winning one, this is where the game ends.

However, in the following, the lot is assumed to be a winning lot. In that case, the prize data, which has been decrypted but still is protected with the innermost digital signature of the lot press, constitutes a prize receipt. Then, in step 618, the player goes on by generating a prize claim message to be sent to the lottery agency, preferably such as the message 1301 shown in FIG. 13. It comprises the transaction identifier 802, the prize receipt 1302, the key delivery receipt 1101 provided by the key holder and the player's certificate 704. It is protected with the player's digital signature 1303. For transmission, the player most preferably encrypts the prize claim message 1301 with the lottery agency's public key, to which the player has got access in a previous step by some method known per se.

In step 619, the lottery agency has received the message 1301 and has decrypted any encryption of this using his private key. The lottery agency checks the authenticity of the prize receipt by using the digital signature of the lot press included in it and by comparing the prize receipt with the data in the prize database; using the same lot identifier, one should find in the prize database a record comprising the same hash as the hash calculated on the prize data field in the prize receipt. In addition, the lottery agency states by means of the receipt 1101 provided by the key holder that the player has acquired the key by legal means. The lottery agency goes on by checking that this particular lot has been sold in checking the sold lots database. If nothing suspicious is found in any of the checks, the game account of the player identified in the prize claim message is credited with the amount indicated by the prize, the lot is removed from the sold lots record and the prize is marked as collected in the prize database.

The procedure described above can be modified in several ways without departing from the scope of the present invention. Many variants are such that enable the safety of the system to be further enhanced. The objective of one variant is that, even if a player would by mistake destroy the data about purchased lots for which potential prizes have not yet been collected, he could make good the situation by asking the lottery agency to deliver the purchased lots once more. This can be performed for instance so that in purchasing a lot, the player encrypts the random number generated for this purchasing transaction by means of his public key and sends it together with the transaction identifier to the lottery agency. The lottery agency stores the data in the database, from where they can be retrieved on the basis of the transaction number if needed. The player can ultimately ask for the data stored in the lottery agency's database to be retransmitted to him, decrypt the random number with his private key and subsequently ask the lottery agency to retransmit the data about the destroyed lots, which the lottery agency reads in the sold lots database.

For the key holder to be able to deliver the key for the same lot to the player repeatedly, the lottery agency has to give the player a new sales receipt in connection with the repeated lot request, the sales receipt showing that a repeated request is being concerned. Should the prize of the lot already have been collected, it is, of course, impossible to make the repeated request, or at least the lottery agency must not deliver data on the sold lots despite the request.

It has been stated above that the key hash can be incorporated also in the primary lot record in the step of generating the lot database, and then it eventually reaches the player after the lot has been purchased. This would enable the player to check, after he has asked for and received the key, whether the hash calculated on the key he has received is identical to the key hash delivered along with the lot. Unless the hashs are identical, the player may note that there has been an error at some stage, which has either corrupted the content of a record or caused transmission of the wrong key record from the key holder to the player.

It has been repeatedly noted above that especially the lottery agency and the key holder perform a great number of checks in order to confirm whether a given message is connected with a legal game proceeding or not. The invention does not set limits to the actions taken in a situation where a check detects an error in a message, a record or any other data element. However, in such a situation, the game is typically interrupted, all kinds of prize payments in connection with this particular game session are prevented, and all the data available on the session are stored in a special error database, allowing the lottery agency and/or key holder(s) to find out the cause of the error, the parties having participated in this game session, and whether the error was or was not caused by the intentional fraudulent action of one of the parties.

One variant of the procedure described above is to complement the lot database periodically with new lots before the number of remaining unsold lots drops below a given threshold value. This measure prevents especially a situation in which there is an exceptionally large number of winning lots among the remaining unsold lots and the total prize sum of the winning lots exceeds their total price. Since lots are sold in a substantially random order, such a situation would be quite conceivable if the lot database would not be complemented. Should somebody fined out that this has happened, it would be worth while for this person to buy all the remaining lots.

In the embodiment of encryption arrangements, it should be noted that computers are getting increasingly higher computing power. All calculatory encryption systems can be broken, provided that adequate initial data, computing power and time are available. If the keys available are long, i.e. the key space available is large, the time required will still be very long even with computing powers much higher than those currently available. The size of the key space is advantageously selected such that the predictable increase in computing power is insufficient to make the encryption systems breakable during the predicted operating life of the system.

The lot press and the key holder are not necessarily two discrete parties, but instead, since in the system described above, they are both assumingly independent "third parties", they may be one and the same party. On the other hand, nothing prevents the lottery agency from simultaneously acting as the key holder, provided that the lot database and the key database can be held apart by some means found to be reliable by all the parties, so that only a player who has acquired a lot from the lot database by legal means is enabled to receive a key corresponding to the lot from the key database.

It has been noted above that the player always first acquires an electronic instant lot and only after this the key with which the prize data in the lot are encrypted. The invention does not, however, exclude the possibility that the player first acquires the key and only then the corresponding lot. Such an order of actions requires some changes in the message modes described above, yet carrying out such changes can be considered obvious to those skilled in the art considering description above of the "conventional" order of deliveries and the associated messages. Also, the payment of the fee can be made dependent of the acquisition of the key and not of the lot.

If the parties participating in the game have great confidence in each other and in the safety of the data transmission, or the real value of the benefits achieved in the game is low or insignificant, the procedure described above can naturally be modified so as to weaken the safety of the system in the practice. In a very elementary system of the invention, the same party acts both as the lot press, the lottery agency and the key holder (with the lot database and the key database apart, however) and the player is not required to register in any way. The lot record may consist simply of an identifier and encrypted prize data. The player requests a lot with a plain-text message, providing at the same time a credit card number or any other data allowing the price of the lot to be charged. The lottery agency picks the lot from the lot database and delivers it to the player, who requests the correct key from the key database on the basis of the identifier in the lot, and decrypts the encrypted prize data in the lot using the key. By presenting the plain-text prize data, the player can claim the prize to be paid to him in any manner known per se. This elementary system is suitable for instance for a children's play game, where the lot price and the prize amount are determined in valueless play money units. Systems with varying degrees of safety are provided by adding to such a very simple system varying amounts of the encryption, certification, signature and random number functions described above, until the system of FIG. 6 is eventually reached.

Figure 14:
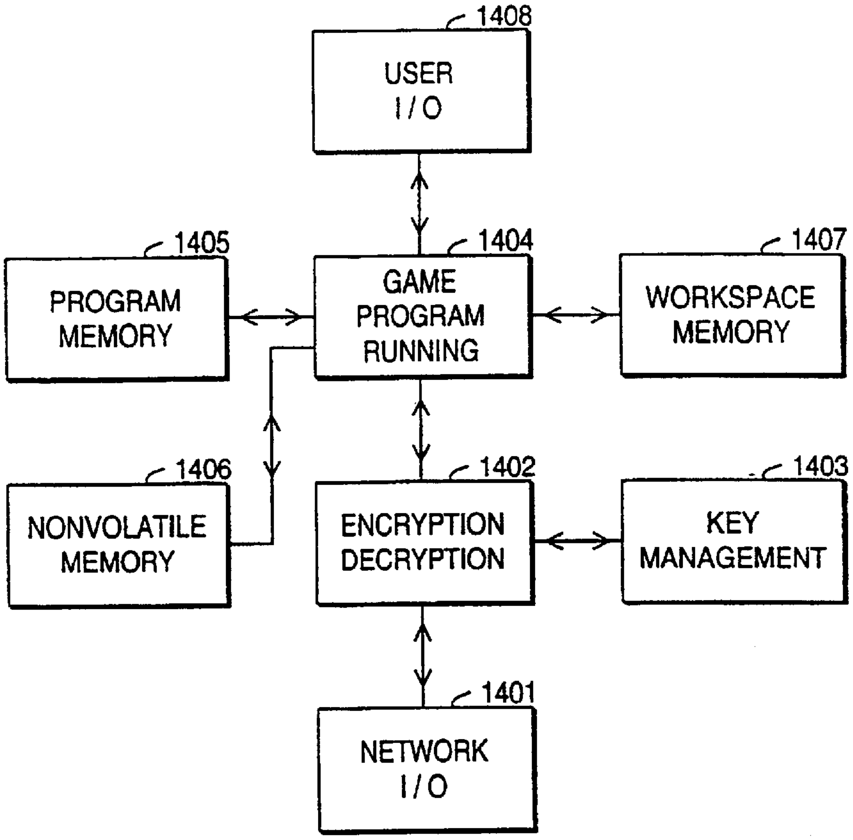
FIG. 14 shows apparatus components in the system according to the invention.

Finally a number of apparatus embodiments will be discussed, which are usable for implementing the method described above in the practice. FIG. 14 shows an apparatus component in general, which is of the type usable in the lot press for generating electronic instant lots and corresponding keys, for arranging the actual game under the control the lottery agency, for performing operations relating to the key database under the control of the key holder, or as the player's terminal, with which the player participates in the electronic instant lottery. The network connection 1401 connects the apparatus component in duplex mode to such a data transmission network which is usable for data transmission between the lot press, the lottery agency, the key holder and the players. The encryption and decryption block 1402 takes care of the encryption, decryption, digital signatures and verification of the signatures of all the data passing over the data transmission network in a manner known per se. In these functions, the block 1402 is assisted by the key management block 1403, in which the public and private keys needed in the functions above have been stored.

The running of the game program proper takes place in the game program running block 1404, which performs commands stored in the program memory 1405 in a given order. The non-volatile memory 1406 is used for storing all the data which shall be available even after any power failure or similar situation, which causes the running data to be erased from the workspace memory 1407. The user may control the operation of the apparatus over the interface 1408.

The use of the apparatus component illustrated in FIG. 14 for different functions in the system will pose slightly different requirements on its parts. In the lot press relatively large databases are treated with the lottery agency and the key holder, whose operations should be as reliable as possible. For this reason, the non-volatile memory 1406 of these applications should be large and preferably back-upped in some manner known per se. The apparatus of the lottery agency will possibly have to treat a very large amount of encrypted data communication in the player direction even over a very short period, implying that the network connection 1401, the encryption and decryption block 1402, and the key management block 1403 in the lottery agency's apparatus must be dimensioned with very high capacity. Also, the game program running block 1404 in the lottery agency's apparatus must operate with multiple efficiency compared to that required for the corresponding block in the player's terminal. Its obvious per se to a person skilled in the art how such requirements are taken into account when the block diagram of FIG. 14 is applied to the various parts of the system of the invention.

The writing transactions between the game running block 1404 and the non-volatile memory 1406 are preferably required to have a "transaction character". The reason for this is that the method of the invention comprises a number of steps which must either all be successful or all fail. For instance, in the step where the player buys an electronic instant lot in the lot database, such mutually dependent steps are the charging of the fee from the player's game account, giving the player access to a given electronic instant lot, and marking the same electronic instant lot as sold.

Although a power failure or any other error situation would interrupt the system operation at a critical moment, this must not result in a situation where the player has e.g. received an electranic instant lot, but the fee has not been charged nor has this particular lot been marked as sold. It is known per se to those skilled in the art how mutually dependent file operations are carried out as transactions, i.e. so that they all either succeed together or all fail together.

Figure 15:
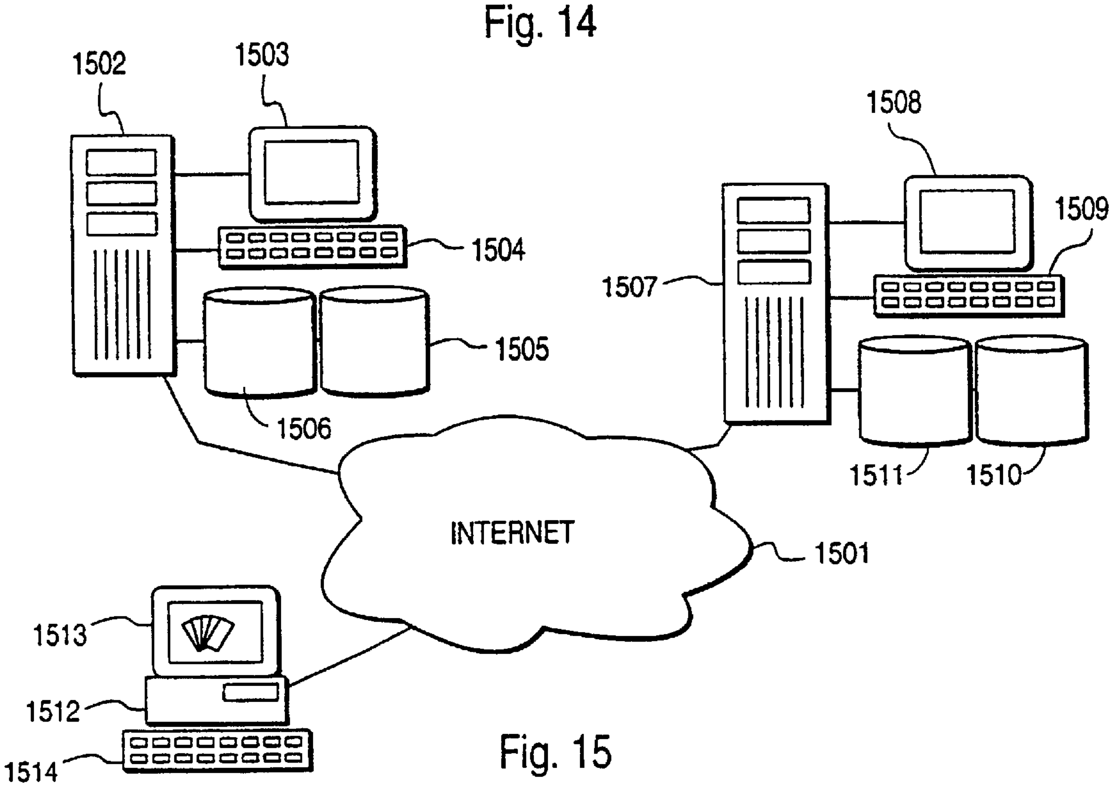
FIG. 15 shows a system according to the invention.

FIG. 15 shows a system of one embodiment of the invention, using the Internet 1501 as the central data transmission means. In this embodiment of the invention the lot press and the key holder are the same party, whose data system has been constructed around the mainframe computer 1502. The blocks 1401, 1402, 1403, 1404, 1405, and 1407 in the figure and the datat transmission between thse can be implemented by utilising in a manner known per se the processor, bus, memory and other parts of the computer 1502 (not represented separately in the figure). The interface, i.e. block 1408 of FIG. 14, consists of a display 1503 and a keyboard 1504. For the non-volatile memory, the system includes a high-capacity storage unit, in which the main mass memory 1505 has been back-upped with a parallel mass memory 1506. The lottery agency's equipment is of the same type, i.e. it comprises a mainframe computer 1507, a display 1508, a keyboard 1509 and mass memories 1510 and 1511, Tge okater's apparatus is a home computer equipped with an Internet connection, including a central processing unit 1512 for implementing the blocks 1401–1407 of FIG. 14 and a display 1513 and a keyboard 1514.

Figure 16:
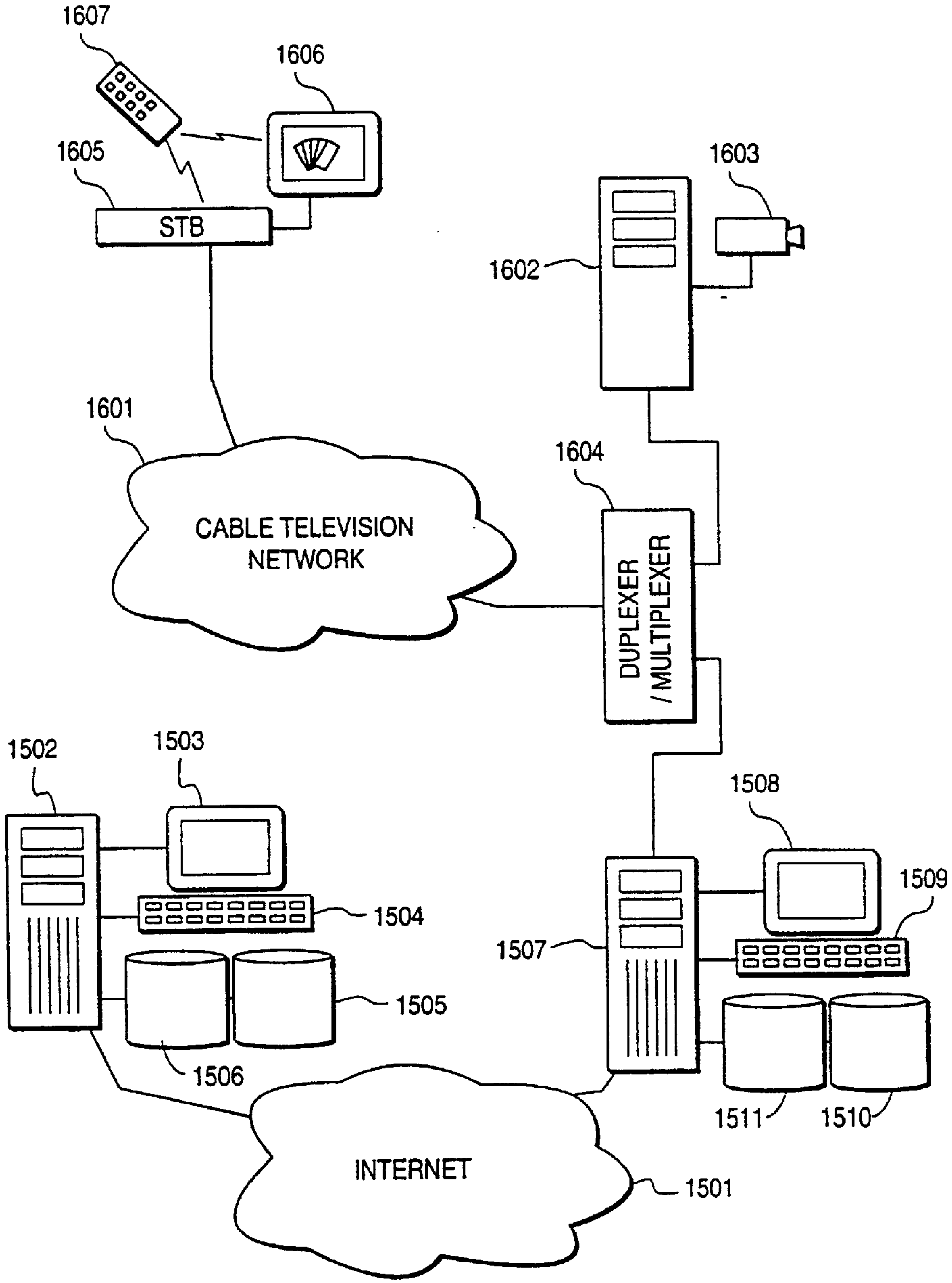
FIG. 16 shows a second system according to the invention and FIG. 17 shows a third system according to the invention.

FIG. 16 shows a sustem of a second embodiment of the invention, where parts 1501–1511 are identical to those in FIG. 15. However, the data transmission bus in the player direction is a digital television network 1601, originally designed for the distribution of digital television broadcasts. The distribution path may be e.g. a cable network or a network performed at least partly with wireless links, where the links may be "terrestrial" and/or satellite-supported. The television broadcasting station 1602 produces television programmes from various programme sources, exemplified by a real-time video camera 1603 for producing direct television broadcasts. The data transmission connection between the lottery agency and the player is multiplexed with a (preferably digital) television transmission in a duplexer multiplexer unit 1604, which, in turn, at the same time takes care of the duplex mode of the data transmission connection between the lottery agency and the player. If there are long wireless link intervals in the distribution network, it may be preferable to separate the downward data transmission (in the player direction) and the upwards data transmission (from the player towards the system) at least partly so that the upwards data transmission utilises partly e.g. the telephone network or the Internet.

The player's apparatus comprises a receiver for digital television broadcasts, i.e. a Set Top Box 1605, which supports the duplex mode of connections passing over the digital television network and possibly also the routing of upwards data transmission over the telephone network and/or the Internet. In addition, the receiver 1605 supports a programming interface, which may be known per se, such as DVB-J, and contains the necessary transceiver, processor and storage means for implementing the blocks 1401–1407 of FIG. 14. The user interface consists of a television screen 1606 and a remote control (or e.g. a wireless keyboard) 1607. One of the advantages of the embodiment shown in FIG. 16 is that the program updates and other downwards data transmission to the player's apparatus can be transferred effortlessly alongside the digital television transmission, allowing to have the benefit of the downwards data transmission capacity, which is high by nature, in the digital television network. The program updates may require the transfer of relatively large amounts of data, and within the large definition above of the electronic instant lot, even quite complex "lots" containing plenty of details can be generated.

Figure 17:
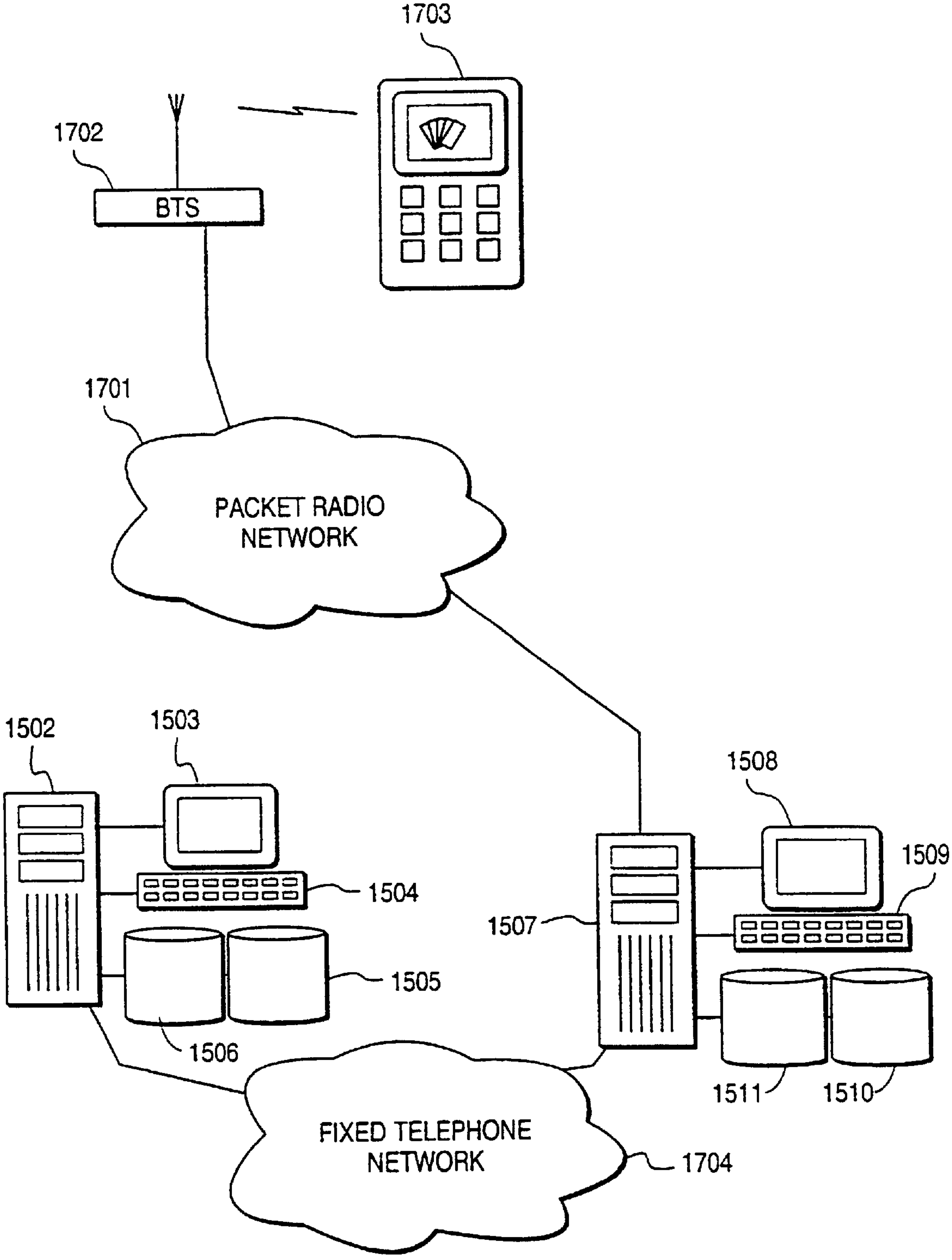

FIG. 17 illustrates the system of a third embodiment of the invention, where parts 1501–1511 are still identical to those of FIG. 15, but instead of the Internet, a fixed telephone network 1704 serves as a data transmission network between the lot press/key holder and the lottery agency. The data transmission bus in the player direction consists of a packet radio network 1701, which may be for instance a GPRS (General Packet Radio Service) network known per se or any other network for offering portable terminals packet-connected data connections. Integrated in the packet radio network 1701 is a base station 1702, which is in radio connection with a given user terminal 1703. All the blocks shown in FIG. 14 are integrated in the latter.

What is claimed is:

1. A method for arranging electronic instant lotteries, comprising the steps of:

generating (605) and storing (606) a plurality of electronic instant lots (510), each of which comprises prize data which is encrypted and can be decrypted with a lot-specific key (511), storing (607) the keys (511) with which the encrypted prize data of stored electronic instant lots can be decrypted, separately from the stored electronic instant lots (510), providing a given player with access to the stored electronic instant lots so that the player acquires a given electronic instant lot, and providing said player with access to the stored keys so that the player acquires a key specific to said given electronic instant lot.

2. A method as defined in claim 1, wherein the step of providing a given player with access to stored electronic instant lots so that the player acquires a given electronic instant lot comprises a sub-step, in which the player pays a given fee.

3. A method as defined in claim 1, wherein the step of providing said player with access to the stored keys so that the player acquires a key corresponding to a given electronic instant lot comprises a sub-step, in which the player presents a proof of his possession of this particular electronic instant lot.

4. A method as defined in claim 1, wherein the step of providing a given player with access to the stored keys so that the player acquires a key corresponding to a given electronic instant lot comprises a sub-step, in which the player pays a given fee.

5. A method as defined in claim 1, wherein the step of providing said player with access to electronic instant lots so that the player acquires a given electronic instant lot comprises a sub-step, in which the player presents a proof of his possession of the key corresponding to this particular electronic instant lot.

6. A method as defined in claim 1, wherein the step of generating (605) and storing (606) a plurality of electronic instant lots comprises, each electronic instant lot for the sub-steps of:

generating a record (501) which comprises an unambiguous identifier (502) of the electronic instant lot and encrypted prize data (503), and protecting said record with an electronic identifier (551, 506, 509) which indicates the producer of the electronic instant lots and whether the content of this particular electronic instant lot has been changed since it was generated.

7. A method as defined in claim 6, wherein, to generate the electronic identifier (551, 506, 509) a specific asymmetric encryption system and a specific unidirectional has calculation function are used, the electronic identifier being the digital signature of the producer of the electronic instant lots, comprising a hash calculated by said hash calculation function on a given part of the electronic instant lot, the hash being encrypted with a given first key of the producer of electronic instant lots, a second key corresponding to this key being known in said asymmetric encryption system.

8. A method for arranging electronic instant lotteries, comprising the steps of:

generating (605) and storing (606) a plurality of electronic instant lots (510), each of which comprises prize data which is encrypted and can be decrypted with a lot-specific key (511), wherein the step of generating (605) and storing (606) a plurality of electronic instant lots comprises for each electronic instant lot the sub-steps of:

generating a record (501) which comprises an unambiguous identifier (502) of the electronic instant lot and encrypted prize data (503), and protecting said record with an electronic identifier (551, 506, 509) which indicates the producer of the electronic instant lots and whether the content of this particular electronic instant lot has been changed since it was generated, wherein, to generate the electronic identifier (551, 506, 509) a specific asymmetric encryption system and a specific unidirectional has calculation function are used, the electronic identifier being the digital signature of the producer of the electronic instant lots, comprising a hash calculated by said hash calculation function on a given part of the electronic instant lot, the hash being encrypted with a given first key of the producer of electronic instant lots, a second key corresponding to this key being known in said asymmetric encryption system, and further wherein, the step for generating (605) and storing (606) a plurality of electronic instant lots comprises, for each electronic instant lot, the sub-steps of:

generating a prize data field (503) consisting of a part (504) indicating a prize corresponding to the electronic instant lot and of a random number (505) and which is protected with the digital signature (551) of the producer of the electronic instant lot and encrypted and decryptable with a lot-related key, generating a primary lot record (550), which consists of said prize data field (503) and an unambiguous identifier (502) of the electronic lot and which is protected with a digital signature (506) of the producer of the electronic instant lots, generating a supplementary data field (560) comprising a hash (507) calculated on said prize data field and a hash (508) calculated on said lot-related key, and protecting the electronic instant lot with the digital signature (509) of the producer of instant lots, storing (607) the keys (511) with which the encrypted prize data of stored electronic instant lots can be decrypted, separately from the stored electronic instant lots (510), providing a given player with access to the stored electronic instant lots so that the player acquires a given electronic instant lot, and providing said player with access to the stored keys so that the player acquires a key specific to said given electronic instant lot.

9. A method as defined in claim 8, wherein a hash is additionally calculated on said lot-related key and added to said primary lot record.

10. A method as defined in claim 8, wherein, for storing the keys with which the encrypted prize data of the electronic instant lots can be decrypted, a key record (512) is stored for each electronic instant lot, wherein the key record comprises the identifier (502) of the corresponding electronic instant lot and the key (513) with which the encrypted prize data of the corresponding electronic instant lot can be decrypted, and which is protected with the digital signature (514) of the producer of the key record.

11. A method as defined in claim 10, wherein a prize data record (516) is stored for each electronic instant lot, and wherein the prize data record comprises the identifier (502) of the corresponding electronic instant lot and a hash (507) calculated on a given prize-indicating part of the electronic instant lot with a given unidirectional hash calculating function, and which is protected with the digital signature (517) of the producer of the prize record.

12. A method as defined in claim 11, wherein a given lot press generates a lot database consisting of electronic instant lots, a prize database consisting of prize records corresponding to the generated electronic instant lots and a key database (605) consisting of key records corresponding to the generated electronic instant lots, the lot press delivers the lot database and the prize database to a given lottery agency (510, 515) and the key database to a given key holder (511), the lottery agency and the key holder install the delivered databases in given game and key servers (606, 607), a given player registers (608) in the game system of the lottery agency, and then a given game account is opened for him in the lottery agency's game system, the player sends (609) the lottery agency a request for an electronic instant lot and an order to charge the corresponding fee from the game account (701), the lottery agency charges a fee corresponding to the electronic instant lot from the game account and chooses a given electronic instant lot for the player, the lottery agency generates (611) a given sales receipt (801) as evidence of the legal acquisition of the electronic instant lot by the player, the lottery agency sends (612) the electronic instant lot and the sales receipt (901) to the player, the lottery agency marks (613) the transmitted electronic instant lot as sold, the player sends (615) the sales receipt to the key holder in order to receive (1001) the key corresponding to the electronic instant lot, the key holder checks (616) the sales receipt to verify that the player has acquired the electronic instant key by legal means and sends (617) the player the key corresponding to the electronic instant lot and proof (1101) of the player having acquired the key by legal means (1201), the player decrypts (618) the prize data of the electronic instant lot in his possession, the player sends the lottery agency the decrypted prize data and the received proof of having acquired the key by legal means (1301), the lottery agency checks (619) that the electronic instant lot has been sold, that the player has acquired the key by legal means and that the prize record corresponding to the electronic instant lot in the prize database is equivalent to the prize data sent by the player, and the lottery agency credits (619) the player's game account with the prize indicated by the prize data.

13. A method as defined in claim 12, wherein said request (701) for an electronic instant lot comprises the player's given public key (702) in a given asymmetric encryption system, a hash (703) calculated on a certain random number by a given unidirectional hash calculating function and a certificate (704) indicating the player's right to said public key, and it is protected with the player's digital signature (705).

14. A method as defined in claim 12, wherein said sales receipt (801) comprises the identifier (502) of an electronic instant lot, the sales transaction identifier (802) of an electronic instant lot, a key hash (508) readable in the electronic instant lot and a hash (703) calculated on the random number provided by a given player by means of a given unidirectional hash calculating function, and it is protected with the lottery agency's digital signature (03) and encrypted with the key holder's public key in a given asymmetric encryption system.

15. A method as defined in claim 12, wherein, in order to send the player an electronic instant lot and a sales receipt, the lottery agency sends a message (901) which comprises the sales transaction identifier (802) of the electronic instant lot, the primary lot record (550) of the electronic instant lot, the sales receipt (801) and a certificate (902) indicating the lottery agency's right to a given public key, and which is protected with the lottery agency's digital signature (903).

16. A method as defined in claim 12, wherein, in order to send the sales receipt to the key holder, the player sends a message (1001) which comprises the identifier (502) of the electronic instant lot, a sales receipt (801), a given random number (703'), the player's given public key (702) in a given asymmetric encryption system and a certificate (704) indicating the player's right to said public key, and which is protected with the player's digital signature (1002).

17. A method as defined in claim 12, wherein said proof (1101) of the legal acquisition of the key by the player comprises the sales transaction identifier (802) of the electronic instant lot and a certificate (1102) indicating the key holder's right to a given public key, and it is protected with the key holder's digital signature (1103).

18. A method as defined in claim 12, wherein, in order to send the key to the player, the key holder sends a message (1201) comprising the identifier (502) of the electronic instant lot, a key record (512) corresponding to the electronic instant lot and readable in the key database and a proof (1101) of the legal acquisition of the key by the player, and which is protected with the key holder's digital signature (1202).

19. A method as defined in claim 12, wherein, in order to send the lottery agency the decrypted prize data, the player sends a message (1301) comprising the sales transaction identifier (802) of the electronic instant lot, decrypted (1302) prize data, a proof (1101) of the legal acquisition of the key by the player and a certificate (704) indicating the player's right to a given public key, and which is protected with the player's digital signature (1303).

20. A method for arranging electronic instant lotteries, comprising the steps of:

generating (605) and storing (606) a plurality of electronic instant lots (510), each of which comprises prize data which is encrypted and can be decrypted with a lot-specific key (511), wherein the step of generating (605) and storing (606) a plurality of electronic instant lots (510), and the step of storing (607) the keys (511) with which the encrypted prize data of the stored electronic instant lots can be decrypted, are repeated several times at given intervals in order to prevent a situation in which the remaining number of previously generated and stored electronic instant lots would be smaller than the number indicated by a given threshold value, storing (607) the keys (511) with which the encrypted prize data of stored electronic instant lots can be decrypted, separately from the stored electronic instant lots (510), providing a given player with access to the stored electronic instant lots so that the player acquires a given electronic instant lot, and providing said player with access to the stored keys so that the player acquires a key specific to said given electronic instant lot.

21. A system for arranging electronic instant lotteries, comprising:

a first data system (401) for generating at least partly encrypted electronic instant lots, a second data system (402, 406) for storing the generated, at least partly encrypted electronic instant lots, a third data system (403, 405) for storing such lot-specific keys with which the electronic instant lots can be decrypted, separately from the electronic instant lots, a data transmission connection from a first data system to a second data system and to a third data system, and means for providing a data transmission connection for a plurality of players (404) to said second data system in order to provide each given player of said plurality of players with access to a given electronic lot of said electronic instant lots and access to said third data system to provide each said given player with access to a key specific to the given electronic lot of said electronic instant lots.

22. A system as defined in claim 21, wherein the first data system (410) is substantially the same as the third data system (403).

23. A system as defined in claim 21, wherein said means for providing a data transmission connection for a plurality of players comprise connections from the second (402) and the third (403) data system to an open data network.

24. A system as defined in claim 21, further comprising, in association with the second data system, means (407) for separating such electronic instant lots to which a given player has already been given access.

25. A system as defined in claim 21, further comprising, in association with the third data system, means for checking a player's verifiable possession of an electronic instant lot before the player is provided access to the key corresponding to this particular electronic instant lot.

26. A system as defined in claim 21, further comprising, in association with the second data system, means for checking a player's verifiable possession of a key corresponding to a given electronic instant lot before the player is provided access to the electronic instant lot corresponding to this particular key.

27. A system for arranging electronic instant lotteries, comprising:

a first data system (401) for generating at least partly encrypted electronic instant lots, a second data system (402, 406) for storing the generated, at least partly encrypted electronic instant lots, means (409), in association with the second data system, for storing prize data corresponding to each electronic instant lot separately from the electronic instant lots a third data system (403, 405) for storing such lot-specific keys with which the electronic instant lots can be decrypted, separately from the electronic instant lots, a data transmission connection from a first data system to a second data system and to a third data system, and means for providing a data transmission connection for a plurality of players (404) to said second data system in order to provide each given player of said plurality of players with access to a given electronic lot of said electronic instant lots and access to said third data system to provide each said player with access to a key specific to the given electronic lot of said electronic instant lots.

* * * * *

UNITED STATES PATENT AND TRADEMARK OFFICE
CERTIFICATE OF CORRECTION

PATENT NO. : 6,685,562 B1
DATED : February 3, 2004
INVENTOR(S) : Anssi Rantanen

It is certified that error appears in the above-identified patent and that said Letters Patent is hereby corrected as shown below:

Column 2
Line 44, please delete "to".

Column 9
Line 36, please delete "comers" and substitute -- corners -- therefor.

Column 11
Line 42, please delete "fined" and substitute -- find -- therefor.

Column 13
Line 46, please delete "datat" and substitute -- data -- therefor.
Line 46, please delete "thse" and substitute -- these -- therefor.
Line 57, please delete "Tge okater's" and substitute -- The player's -- therefor.
Line 62, please delete "sustem" and substitute -- system -- therefor.

Signed and Sealed this

Twenty-fifth Day of May, 2004

JON W. DUDAS
*Acting Director of the United States Patent and Trademark Office*